Aug. 6, 1957 — G. W. HAUCK — 2,802,092
METHOD AND APPARATUS FOR WELDING
Filed Feb. 1, 1954

Inventor:
George W. Hauck.
By Joseph O. Lange
Atty.

United States Patent Office 2,802,092
Patented Aug. 6, 1957

2,802,092

METHOD AND APPARATUS FOR WELDING

George W. Hauck, Oak Park, Ill., assignor to Crane Co., Chicago, Ill., a corporation of Illinois Application February 1, 1954, Serial No. 407,292

6 Claims. (Cl. 219—61)

The present invention pertains to an improvement in the welding of pipe, and more particularly, pertains to an improved method and apparatus whereby the formation of deleterious weld metal compounds with elements of the atmosphere is prevented.

In explanation of the background of this invention, it should be remembered that the formation of welds in the open atmosphere frequently results in many undesirable complications. Weld metal compounds, such as oxides formed with the oxygen of the atmosphere, facilitate the formation of root cracks which in time destroy the effectiveness of the weld. In the welding of pipe, the outer surface of the weld may be adequately protected by means of a welding arc sheathed in an inert gas. However, the underside of the weld may be readily contaminated and weakened by combining with the atmospheric elements which may easily attack such weld through the abutment space existing between the two pipe members to be joined.

Consequently, it has been the practice to position sealing fixtures, such as close-fitting discs, within the pipeline for purposes of sealing off a chamber which straddles the abutting pipe ends. The chamber is then flushed of air, usually with an inert gas, such as argon or helium, and the weld is effected with the danger of unwanted weld metal nitride and oxide formation eliminated. However, when the final welding operation in the line is to be accomplished, there is no manner in which the sealing or chamber-forming fixtures can be conveniently removed from the finished pipe.

It is an important object, therefore, of the present invention to provide a sealing fixture which may be easily and quickly inserted and installed in a pipeline and suitably removed after the welding operation has been completed leaving nothing in the pipeline after the completion of the final weld operation.

It is a further object of my invention to provide a sealing fixture which is adaptable to a wide range of pipe sizes and configurations without the need for any costly and inconvenient adjustment.

It is a still further object of my invention to provide a sealing fixture which is reusable indefinitely and which has a low unit cost.

These and other objects of my invention will become more manifest upon proceeding with the following detailed description read in the light of the accompanying drawings, in which Fig. 1 is a longitudinal sectional assembly view of two pipe members fragmentarily shown intended to be welded together utilizing my invention.

Figure 1:
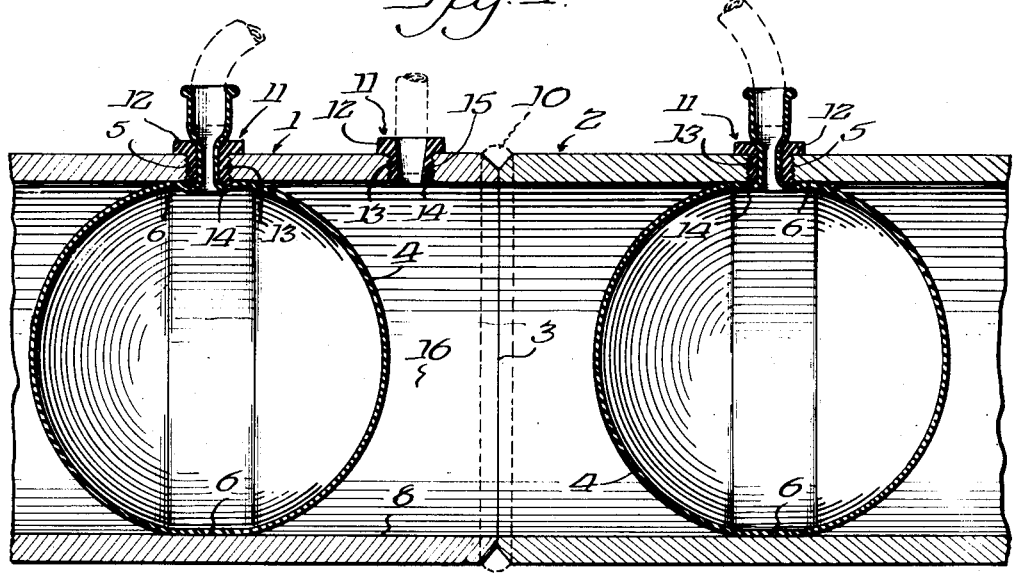

Referring now to Fig. 1, two pipe ends 1 and 2 are fragmentarily illustrated in abutting relation preliminary to having a weld 10 applied to the line of abutment 3. Sealing means comprising the inflatable balloons 4 are inserted in the preferably tapped pipe apertures 5 in a deflated condition and subsequently inflated therein preferably by means of an inert gas, such as argon or helium. The use of an inert gas is a precautionary measure against fire or explosion should the balloons 4 rupture in the course of the welding operation.

Figure 2:
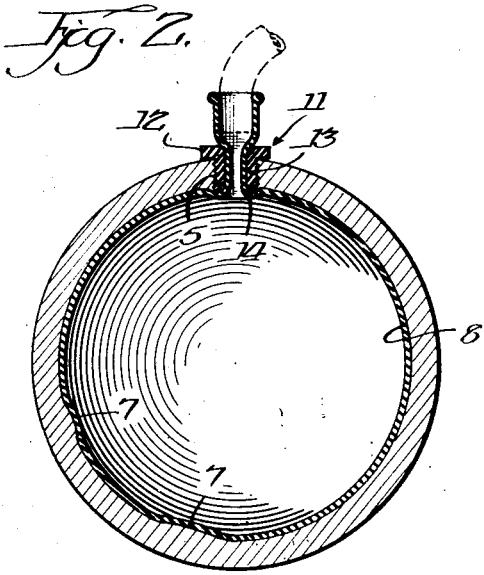
Fig. 2 is a transverse sectional view of Fig. 1.

It will be noted at this time that the sealing means or balloons 4 should preferably have a maximum expansion diameter greater than the diameter of the pipes 1 and 2. This desired relationship is for the obvious purpose of enabling the balloon 4 to expand slightly beyond the inside diameter of the pipes 1 and 2, thus assuring a substantial band and not a line annular contact between the balloon and pipe peripheries. As will be noted from Fig. 1, areas of contact 6 between the balloon and pipe peripheries are depicted as lines in cross-section and not points. However, the ability of the balloons 4 to expand beyond the diameter of the confining pipe also enables the balloon peripheries to have a resilient surface even when in the proper inflated sealing position. Thus, the usual minor projections and imperfections 7 in the pipe wall, as illustrated in Fig. 2, will not tear or rupture the balloon wall which is enabled to stretch in conformance with the entire inner peripheral pipe surface 8.

Figure 3:
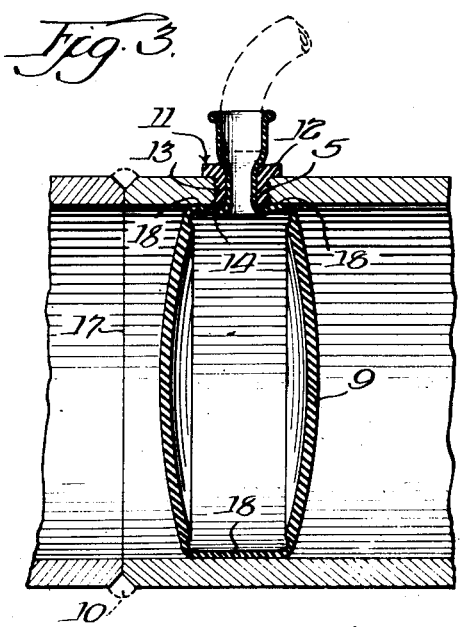
Fig. 3 depicts a modified rubber insert having a disc-like configuration.

Fig. 3 depicts an inflatable member 9 which may assume the form of a disc when in the inflated condition. Utilizing such inflatable members, the pipe apertures 5 may be tapped closer to the line of abutment 17 as the latter disc configuration of the inflated member will not possess the volume of the usual spherical balloon. Thus, less time and inert gas need be expended in effecting a closed chamber of an inert atmosphere. The more substantial surface contact and therefore increased sealing ability at contact surfaces 18 illustrate an advantage of utilizing such form of an expansible member.

The inserts or bushings 11 of rubber or other soft material are illustrated in all views, positioned in the pipe apertures 5. The purpose of these inserts is to obviate any rubbing or abrasion of the balloons 4 against the corner peripheries of the pipe apertures 5. The inserts 11 preferably have flanged top edges 12 for proper positioning on the pipe outer surfaces. The body portion 13 of the insert should extend slightly beyond the thickness of the pipe walls as depicted. The end limit 14 of the insert 11 may be rounded as illustrated in order to further prevent abrasive action with the balloon fabric.

Referring once more to Fig. 1, the survey hole 15 located between the two pipe line apertures 5 serves the secondary purpose of providing a means for the introduction of an inert gas, such as argon or helium. The gas purges the chamber 16 of the atmosphere and is continually passed through the chamber during the welding operation at a pressure dependent upon the rate of the escape of the gas from chamber 16 through the non-welded portion of the abutment 3. Thus, the formation of objectionable nitrides and oxides and other deleterious weld metal compounds with elements of the atmosphere is prevented. An insert 11 may be employed at aperture 15 for effecting a gas tight seal with the gas source and also for protecting the threads of the aperture 8.

Following the completion of the weld, the balloons 4 are deflated and are easily removed from the chamber 16. The inserts 11 are also removed from the tapped apertures 5 and plugs (not shown) inserted therein. The plugs may be suitably welded about the edges, thereby insuring a fluid-tight seal with the pipe members.

It is, of course, appreciated that where conduits having a noncircular or rectilinear cross section are to be welded, sealing means may be suitably shaped and fabricated to form a tight seal with the inner surface of such conduit. Such means may be fabricated having approximately the same configuration in the expanded condition as the cross section of the particular conduit. The production of such expansible means of unusual cross-section would be warranted, however, only where repeated or extensive use is intended.

Thus, it is apparent that I have presented an improved simple method and apparatus for pipe welding operations. The improvement comprises an inexpensive inflatable means to be inserted on either side of the weld so as to form a chamber capable of maintaining an inert atmosphere thereby obviating the formation of deleterious weld metal compounds with elements of the atmosphere.

Whereas, my invention has been described in detail in the above specification, it is obvious that other modifications may be incorporated in equivalent structures and I therefore wish to be limited only by the scope of the appended claims.

I claim:

1. In the method for preventing weld metal compounds from forming with gaseous elements of the atmosphere in the welding of abutting pipe ends or the like, the said method comprising the steps of providing a closed chamber traversing abutting ends of adjoining pipe, positioning oppositely disposed substantially sphere-like expansible members within the pipe and effecting the inflation of said sphere-like expansible members, each of the said expansible members being disposed on opposite sides of the said pipe abutting ends and thereby forming when inflated the end limits of the closed chamber, and venting the closed chamber before welding.

2. In a method for preventing weld metal compounds from forming with gaseous elements of the atmosphere in the welding of adjoining pipe ends, the said method comprising the steps of providing a closed chamber traversing the adjoining ends of the pipe, providing the adjoining ends of the pipe on either side of the weld with substantially transverse openings exteriorly accessible to said chamber, the steps including the insertion of inflatable means through the said transverse openings in a substantially uninflated condition and thereafter inflating the inflatable means to form a closed chamber therebetween and preliminary to effecting the welding of the adjoining pipe ends, thereafter removing air from the chamber between the inflatable means to prevent formation of weld metal compounds.

3. A method for the prevention of weld metal compounds formation with gaseous elements of the atmosphere in the welding of abutting pipe members, said method comprising the steps of forming a closed chamber between said abutting pipe members by substantially circular inflatable means of hollow closed chamber form inserted therewithin, and flushing of the air of said closed chamber with an inert gas or the like.

4. In apparatus for effecting an airtight chamber of a predetermined length in a pipeline, said apparatus comprising a plurality of independently inflatable means inserted in said pipeline at intervals corresponding to the end limits of the airtight chamber, the said inflatable means being inserted through apertures in said pipeline in deflated condition, the said inflatable means being inflated after insertion in said pipeline, said inflatable means when inflated having a maximum circumference greater than the inner circumference of the pipeline.

5. In an improved welding method for pipeline or the like comprising two pipe ends in abutting relationship, the improvement comprising the insertion of independently inflatable means in each of said abutting pipes through exteriorly accessible pipe wall apertures adjacent the weld connection whereby the inflatable means define walls and the end limits of a closed chamber adjacent the weld connection upon being inflated, the method including the provision of an exteriorly accessible aperture in the pipeline intermediate said inflatable means whereby inert gas may be permitted to enter the closed chamber.

6. In apparatus for making a substantially airtight chamber for making a welded joint or the like of end abutting substantially tubular members having openings in the walls thereof exteriorly accessible and positioned on either side of the weld connection, the apparatus including a plurality of inflatable means insertable through the said openings preliminary to effecting the weld connection, said inflatable means forming transversely extending walls defining the end limits of a chamber traversing the weld connection, the inflatable means being subsequently deflatable to permit removal through said openings.

References Cited in the file of this patent

UNITED STATES PATENTS

| | | |
|---|---|---|
| 2,331,937 | Schreiner | Oct. 19, 1943 |
| 2,496,188 | Wiese | Jan. 31, 1950 |
| 2,654,014 | Schaefer | Sept. 29, 1953 |